United States Patent
Hobart et al.

(10) Patent No.: US 9,844,990 B2
(45) Date of Patent: Dec. 19, 2017

(54) MULTIPLE ENVIRONMENT UNMANNED VEHICLE

(71) Applicant: National Technology & Engineering Solutions of Sandia, LLC, Albuquerque, NM (US)

(72) Inventors: Clinton G. Hobart, Albuquerque, NM (US); William D. Morse, Albuquerque, NM (US); Robert James Bickerstaff, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 15/422,252

(22) Filed: Feb. 1, 2017

(65) Prior Publication Data

US 2017/0136840 A1    May 18, 2017

Related U.S. Application Data

(63) Continuation of application No. 14/484,138, filed on Sep. 11, 2014, now Pat. No. 9,580,172.

(Continued)

(51) Int. Cl.
*B64C 39/02* (2006.01)
*B60F 5/02* (2006.01)
(Continued)

(52) U.S. Cl.
CPC ............ *B60F 5/02* (2013.01); *B60F 3/003* (2013.01); *B60F 3/0007* (2013.01); *B60F 5/006* (2013.01); *B63G 8/001* (2013.01); *B63G 8/08* (2013.01); *B64C 37/00* (2013.01); *B64C 39/024* (2013.01); *B64D 47/08* (2013.01); *B63G 2008/004* (2013.01); *B64C 2201/00* (2013.01); *B64C 2201/021* (2013.01); *B64C 2201/028* (2013.01);
(Continued)

(58) Field of Classification Search
CPC ....... B64C 25/405; B64C 25/50; B64C 25/34; B64C 37/00; B64C 2201/00; B64C 39/024; B64D 2205/00; B60Y 2200/80
See application file for complete search history.

(56) References Cited

U.S. PATENT DOCUMENTS 2,470,783 A * 5/1949 Mead ............... B64C 35/00
116/210
2,562,491 A * 7/1951 Hall ................. B64C 37/00
244/2

(Continued)

FOREIGN PATENT DOCUMENTS

WO    WO 2011131733 A2 * 10/2011 ........... B64C 39/024
WO    WO 2011/149544 A1    12/2011

OTHER PUBLICATIONS

International Search Report and Written Opinion dated Nov. 2, 2015, for PCT/US 14/69141 filed Dec. 8, 2014.

*Primary Examiner* — Benjamin P Lee
(74) *Attorney, Agent, or Firm* — Daniel J. Jenkins

(57) ABSTRACT

A MEUV that is able to navigate aerial, aquatic, and terrestrial environments through the use of different mission mobility attachments is disclosed. The attachments allow the MEUV to be deployed from the air or through the water prior to any terrestrial navigation. The mobility attachments can be removed or detached by and from the vehicle during a mission.

14 Claims, 9 Drawing Sheets

Related U.S. Application Data

(60) Provisional application No. 61/877,829, filed on Sep. 13, 2013.

(51) Int. Cl.
  *B60F 3/00* (2006.01)
  *B60F 5/00* (2006.01)
  *B63G 8/00* (2006.01)
  *B63G 8/08* (2006.01)
  *B64C 37/00* (2006.01)
  *B64D 47/08* (2006.01)

(52) U.S. Cl.
  CPC .. *B64C 2201/082* (2013.01); *B64C 2201/121* (2013.01); *B64C 2201/126* (2013.01); *B64C 2201/127* (2013.01); *B64C 2201/146* (2013.01); *B64C 2211/00* (2013.01)

(56) References Cited

U.S. PATENT DOCUMENTS

| | | | | |
|---|---|---|---|---|
| 2,791,867 | A * | 5/1957 | Dasher | A63H 27/00 244/2 |
| 3,029,042 | A * | 4/1962 | Martin | B60F 3/00 180/119 |
| 3,605,935 | A * | 9/1971 | Gilbert | B60F 5/02 104/118 |
| 4,579,297 | A * | 4/1986 | Ayoola | B60F 3/00 244/106 |
| 4,899,954 | A * | 2/1990 | Pruszenski, Jr. | B64C 37/00 244/2 |
| 4,913,375 | A * | 4/1990 | Fitzpatrick | B64C 37/00 114/272 |
| 5,082,198 | A * | 1/1992 | Patel | B64C 37/00 114/273 |
| 6,517,026 | B1 * | 2/2003 | Smith | B60F 3/00 244/2 |
| 6,848,647 | B2 * | 2/2005 | Albrecht | B64B 1/20 114/272 |
| 6,866,224 | B2 * | 3/2005 | Smith | B64C 25/12 244/101 |
| 7,658,346 | B2 * | 2/2010 | Goossen | B64C 27/20 244/17.11 |
| 7,946,530 | B1 * | 5/2011 | Talmage, Jr. | B64C 27/006 244/118.2 |
| 8,167,234 | B1 * | 5/2012 | Moore | B64C 37/00 244/17.23 |
| 8,342,440 | B2 * | 1/2013 | Papanikolopoulos | A63H 27/12 244/17.11 |
| 8,464,816 | B2 * | 6/2013 | Carrier | B62D 53/005 180/24.07 |
| 9,061,558 | B2 * | 6/2015 | Kalantari | A63H 27/12 |
| 9,145,207 | B2 * | 9/2015 | Moschetta | B64C 25/36 |
| 9,315,266 | B2 * | 4/2016 | Vetter | B64C 29/0008 |
| 9,493,235 | B2 * | 11/2016 | Zhou | B60F 5/02 |
| 2002/0125367 | A1 * | 9/2002 | Killingsworth | B60F 3/00 244/17.11 |
| 2002/0139894 | A1 * | 10/2002 | Sorensen | B60V 1/08 244/2 |
| 2003/0173454 | A1 * | 9/2003 | Brown | B64C 35/008 244/2 |
| 2003/0218099 | A1 * | 11/2003 | Preston | B60F 5/006 244/138 R |
| 2004/0211862 | A1 * | 10/2004 | Elam | A63H 27/02 244/58 |
| 2005/0247819 | A1 * | 11/2005 | Caruso | B60F 5/02 244/2 |
| 2006/0162638 | A1 * | 7/2006 | Boncodin | B60V 1/04 114/272 |
| 2007/0012817 | A1 * | 1/2007 | Parmley, Sr. | B60F 5/00 244/2 |
| 2008/0001025 | A1 * | 1/2008 | Said | B64C 3/385 244/13 |
| 2008/0032571 | A1 | 2/2008 | Dudek et al. | |
| 2008/0251308 | A1 * | 10/2008 | Molnar | B62K 13/00 180/209 |
| 2009/0121071 | A1 * | 5/2009 | Chan | B60V 1/08 244/2 |
| 2010/0193626 | A1 | 8/2010 | Goossen et al. | |
| 2011/0042507 | A1 * | 2/2011 | Seiford, Sr. | B60F 5/02 244/2 |
| 2011/0046821 | A1 | 2/2011 | Grabowsky et al. | |
| 2011/0163197 | A1 * | 7/2011 | Farrag | B60F 5/02 244/2 |
| 2011/0315806 | A1 * | 12/2011 | Piasecki | G05D 1/102 244/2 |
| 2012/0168555 | A1 * | 7/2012 | Shcherbakov | B64B 1/00 244/2 |
| 2012/0292435 | A1 * | 11/2012 | Karem | B64C 1/00 244/36 |
| 2013/0068876 | A1 * | 3/2013 | Radu | B60F 5/02 244/2 |
| 2013/0126666 | A1 * | 5/2013 | Brown | B60F 5/02 244/2 |
| 2013/0206915 | A1 * | 8/2013 | Desaulniers | B64C 39/024 244/165 |
| 2014/0021291 | A1 * | 1/2014 | Vetter | B64C 39/003 244/19 |
| 2014/0061362 | A1 * | 3/2014 | Olm | B60F 5/02 244/2 |
| 2014/0231593 | A1 * | 8/2014 | Karem | B64C 1/0009 244/45 R |
| 2015/0028150 | A1 * | 1/2015 | Klein | B64C 3/385 244/2 |
| 2015/0203184 | A1 * | 7/2015 | Sarmiento | B64B 1/24 244/30 |
| 2015/0217613 | A1 * | 8/2015 | Piasecki | G05D 1/102 701/2 |
| 2015/0274000 | A1 * | 10/2015 | Meager | B60K 7/00 440/12.66 |
| 2017/0029106 | A1 * | 2/2017 | Chang | B64C 25/56 |

* cited by examiner

MULTIPLE ENVIRONMENT UNMANNED VEHICLE

CROSS-REFERENCE TO RELATED APPLICATIONS

This application is a Continuation of U.S. patent application Ser. No. 14/484,138, "MULTIPLE ENVIRONMENT MOBILE ROBOT", filed Sep. 11, 2014, and claims benefit of U.S. Provisional Patent Application No. 61/877,829, "MULTIPLE ENVIRONMENT MOBILE ROBOT", filed Sep. 13, 2013, both of which are incorporated by reference herein in their entireties.

GOVERNMENT RIGHTS

This invention was made with Government support under Contract No. DE-AC04-94AL85000 awarded by the U.S. Department of Energy. The Government has certain rights in the invention.

FIELD

The invention relates generally to unmanned vehicles, and more particularly to an unmanned vehicle capable of operating in land, sea and air environments.

BACKGROUND OF THE INVENTION

An unmanned vehicle (UV) is an autonomous or semi-autonomous craft that performs one or more functions as if one or more persons were aboard. In recent years, developmental interest in unmanned land, sea, air and space vehicles and vehicle systems has increased for a variety of military and civilian applications. Unmanned vehicle use has potential economic and risk benefits. Especially attractive is the ability of unmanned vehicles to perform dangerous or hazardous tasks without risk to humans. "Unmanned aerial vehicles" (abbreviated "UAVs") are also referred to as "unpiloted aircraft" or "flying drones."

At this time, UVs have been designed to perform in multiple environments, including land, sea and air environments. Unmanned Ground Vehicles (UGVs) are most predominant in the Explosive Ordinance Disposal (EOD) community for their ability to remove humans from dangerous situations. However, other UGV systems have been developed for discreet surveillance of targets, patrolling of security perimeters, and remote sensing. Unmanned Underwater Vehicles (UUVs) are currently used for a variety of missions including ocean floor mapping, remote sensing and countermeasure operations. UAVs are primarily used for remote sensing and surveillance as well as payload delivery. The mission that all three of these unmanned vehicles support is remote sensing; however there are gaps in each system's abilities to provide sensor feedback of a remote target. UAV's have limited loiter time and to remain undetected must maintain a fairly sizable standoff distance from the target. UUVs operate only in water and rarely is a target located in this environment. UGVs have a limited range and mobility limits the terrain the vehicle can cover.

A need remains, therefore, for a UV that is capable of operating in multiple environments. A need also remains for a ground based vehicle that allows for close proximity surveillance that is initially delivered through UUV or UAV modes.

SUMMARY OF THE INVENTION

According to the invention, a UV is disclosed that is capable of operating in multiple environments. The multiple environments include land, sea and air. The UV includes a platform that can accept payloads and mobility attachments for a variety of missions in multiple environments.

According to an embodiment of the invention, a multiple environment UV is disclosed that includes a central platform and two or more mobility attachments connected to the central platform. The central platform includes a control unit, drive system, power supply and a payload. The two or more mobility attachments are selected from a group consisting of an aerial configuration kit, an aquatic configuration kit, and a land configuration kit.

According to another embodiment of the invention, a multiple environment UV system is disclosed that includes a multiple environment unmanned vehicle and a command center comprising a user interface. The multiple environment unmanned vehicle includes a central platform and two or more mobility attachments connected to the central platform. The two or more mobility attachments are selected from a group including an aerial configuration kit, an aquatic configuration kit, and a land configuration kit. The command center includes a user interface.

According to another embodiment of the invention, a method for operating a multiple environment UV is disclosed that includes launching the multiple environment unmanned vehicle and reconfiguring the multiple environment unmanned vehicle during a mission. The multiple environment unmanned vehicle is reconfigured between an aerial to aquatic, aerial to land and aquatic to land configuration.

DESCRIPTION OF THE INVENTION

The Multiple Environment Unmanned Vehicle (MEUV) was developed to address the need for mobile robotic vehicles to traverse through more than a single type of environment. The MEUV is able to navigate aerial, aquatic, and terrestrial environments through the use of different mission mobility attachments. The attachments allow the MEUV to be deployed from greater distances either from the air or through the water prior to any terrestrial navigation that would be done by the terrestrial MEUV configuration. The mobility attachments can be removed or detached by the vehicle during a mission. The MEUV possesses the unique ability to be deployed in one environment and conduct a mission in a different environment.

According to an embodiment of the invention, the MEUV may be deployed aerially to enter a desired area where the mission would then turn into ground surveillance. The MEUV is configured such that a chassis or central platform contains a control system or module containing the operational instructions, while various external accessories including mobility attachments are utilized dependent on the environment contained in the mission profile.

Figure 1:
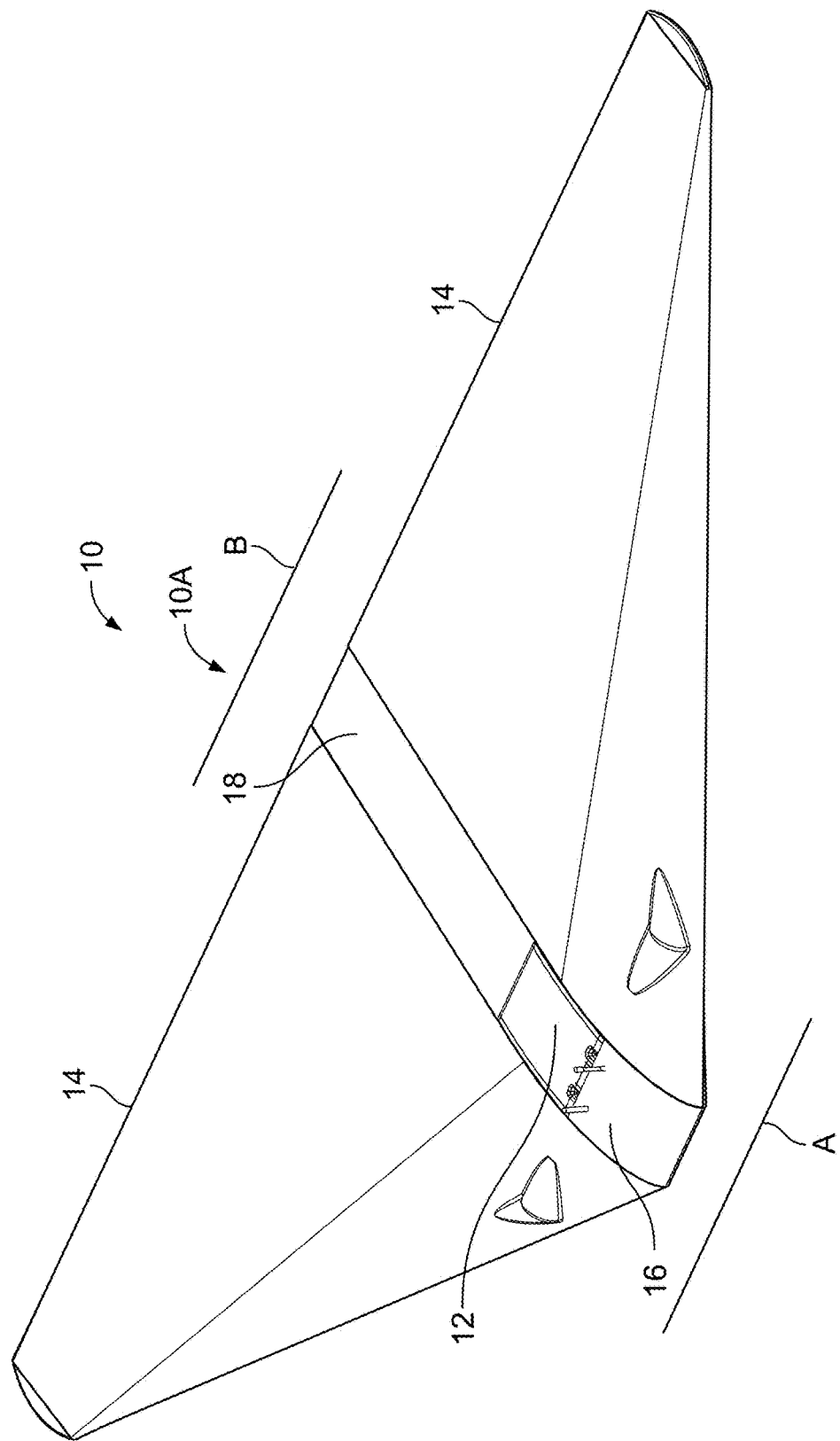
FIG. 1 is a perspective view of an embodiment of a unmanned vehicle according to the present invention.
Figure 2:
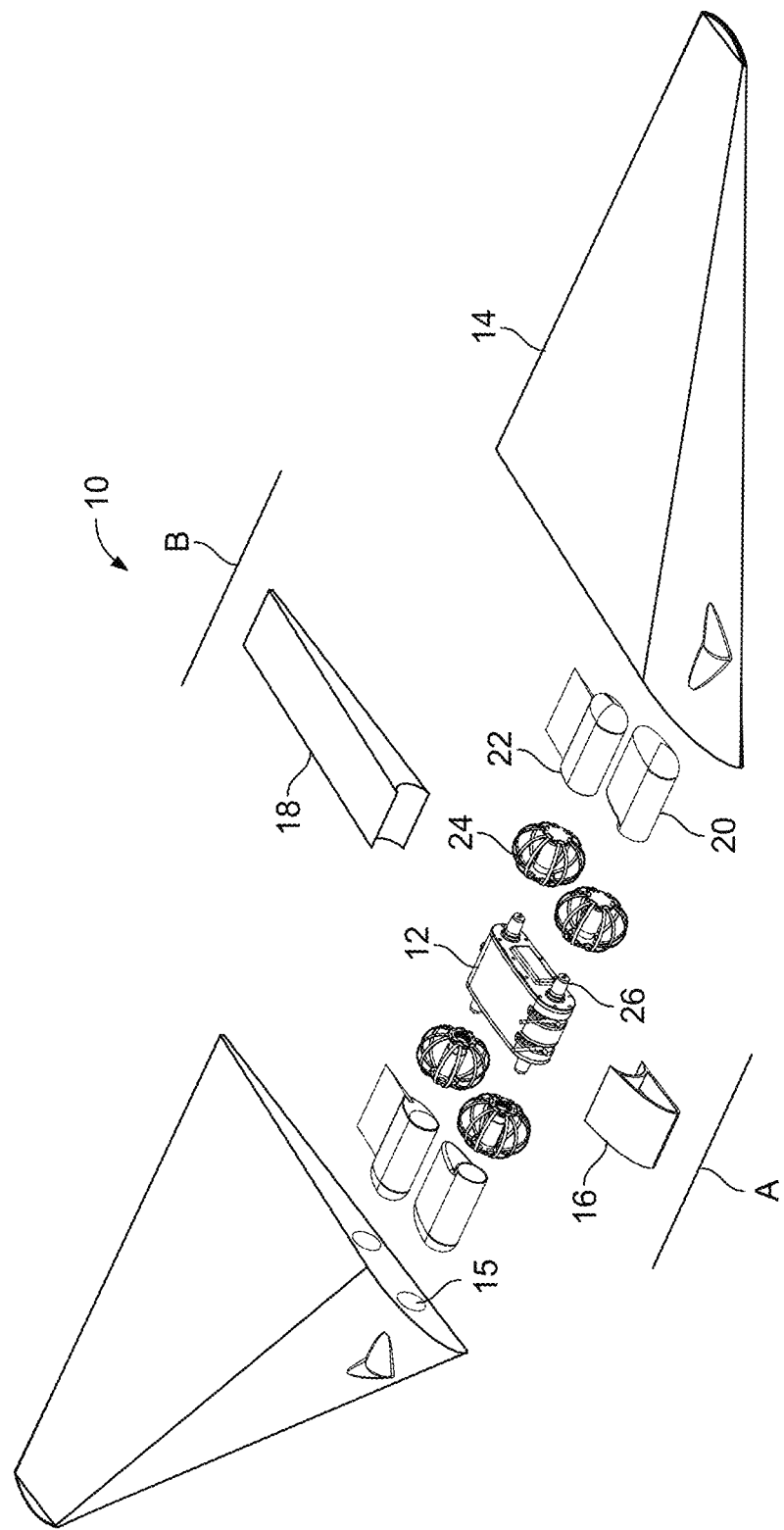
FIG. 2 is a partially exploded view of the unmanned vehicle of FIG. 1.

FIGS. 1 and 2 illustrate an embodiment of an MEUV 10 according to the invention. In FIG. 1, the MEUV is shown in a MEUV flight or aerial configuration 10A. As can be seen in FIG. 1, the MEUV aerial configuration is an unmanned air vehicle (UAV) having a delta-wing configuration with controlled flight capability. The MEUV aerial configuration 10A includes a chassis or central platform (platform) 12, and wings 14, a nose assembly 16 and a tail assembly 18 attached to the platform 12. These components may be referred to as the MEUV aerial configuration kit.

Referring to FIG. 1, the wings 14 are pivotally attached to the platform 12 and can be pivoted or controlled by the platform 12 to control flight. This capability will be described in more detail below in discussing the platform 12. In this exemplary embodiment, the wings 14 form a delta-wing configuration. In another embodiment other wing geometries may be used. In yet another embodiment, one or both of the wings 14 may be fixed or attached so to the platform 12 so as not to pivot, and the MEUV aerial configuration 10A may be an uncontrolled glider. In yet another embodiment, one or both of the wings 14 may be fixed to not pivot, and control of the MEUV aerial configuration 10A may be performed by the tail assembly 18 or other flight control feature attached to and controlled by the platform 12. As can be seen in FIG. 2, the wings 14 include openings 15.

The nose and tail assemblies 14, 16 provide aerodynamic stability and reduced drag to the MEUV aerial configuration 10A. In this exemplary embodiment, the tail assembly 18 is fixed to the platform 12, however, in other embodiments, the tail assembly 18 may be controllably attached to the platform 12 to provide controlled flight. In another embodiment, the tail assembly 18 may have additional and/or other geometries, such as, but not limited to vertical tail and other control surfaces to provide controlled flight to the MEUV 10 aerial configuration 10A. The MEUV 10 and its components will be considered to have a front as indicated as towards line A and a rear as indicated as towards line B.

As can be seen in FIG. 2, the MEUV 10 further includes other mobility attachments, including control planes 20, propulsion planes 22, and wheels 24 that are internal to the MEUV aerial configuration 10A. The control and propulsion planes 22, 24 may be referred to as the aquatic kit. The wheels 24 may be referred to as the land kit. These internal components that are other mobility attachments will be discussed in further detail below in discussing other MEUV configurations. The MEUV 10 including two or more mobility attachments may be referred to as a MEUV kit.

Figure 3:
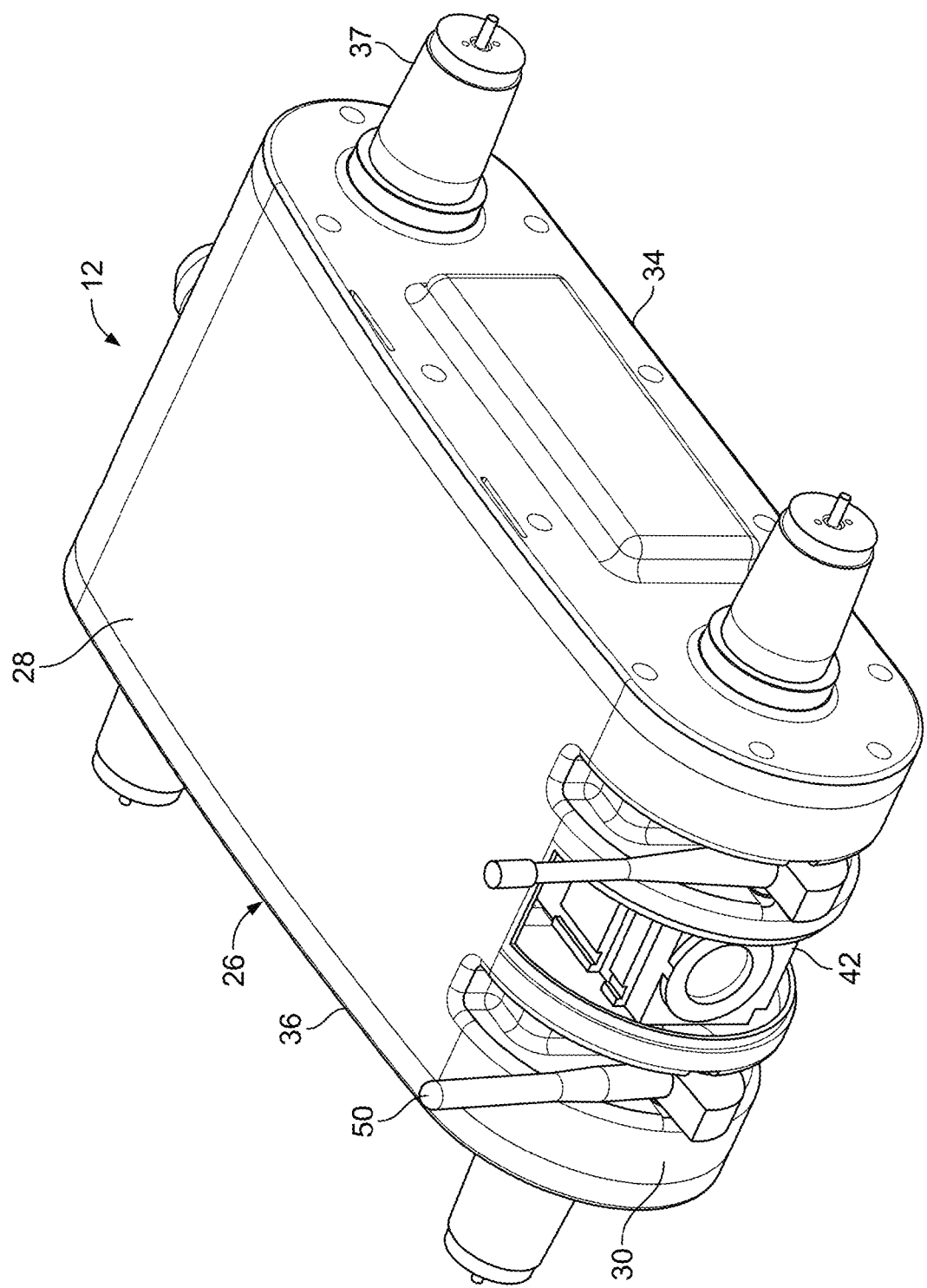
FIG. 3 is a perspective view of an embodiment of a central platform according to the invention.
Figure 4:
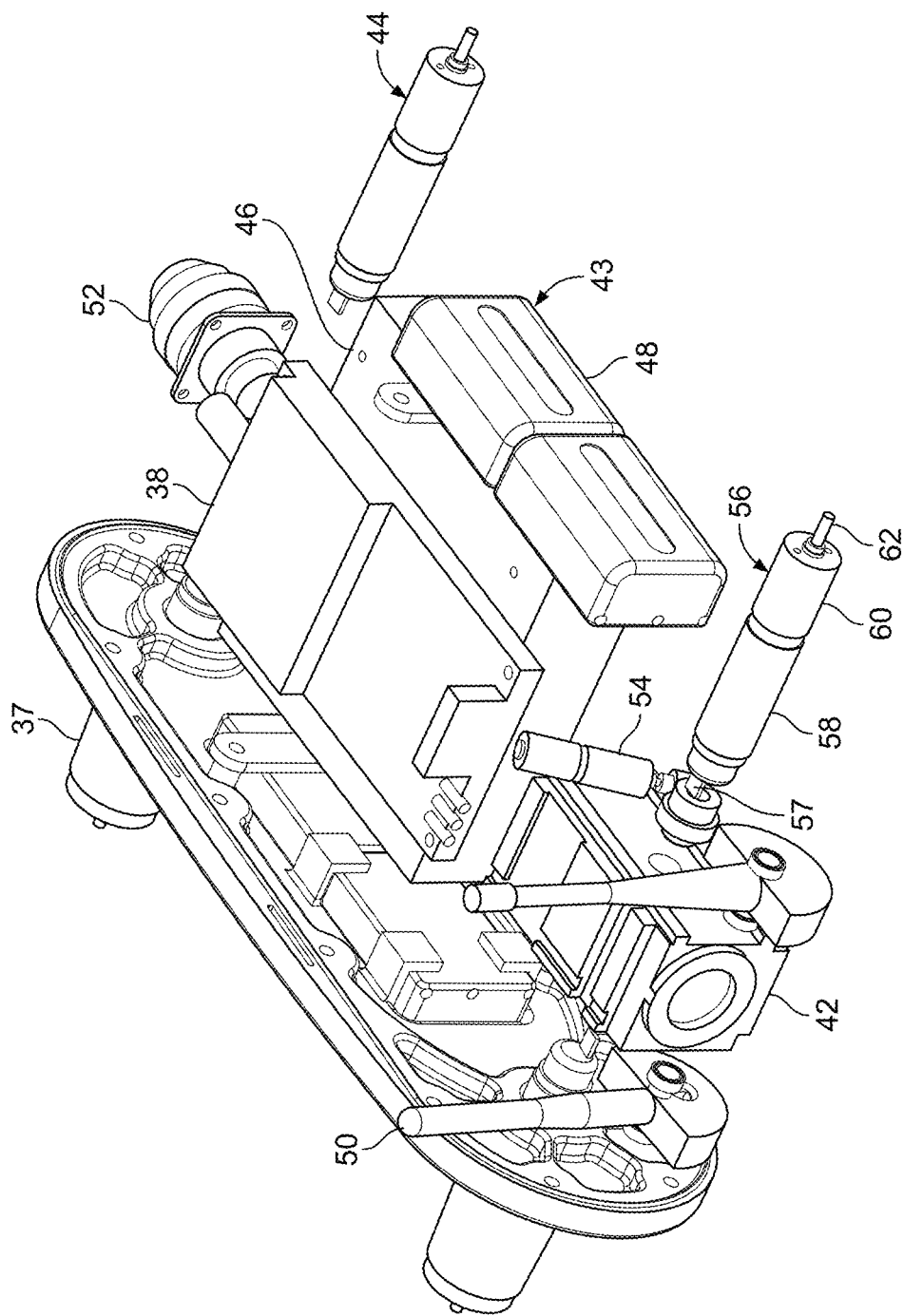
FIG. 4 is a partially exploded view of the central platform of FIG. 3.

FIGS. 3 and 4 illustrate an embodiment of the platform 12 according to the invention. As can be seen in FIG. 3, the platform 12 includes a housing 26. The housing 26 includes a top panel 28, a bottom (not shown), a front panel 30, a rear panel 32, a first side panel 34, a second side panel 36 and drive unit housings 37. In this exemplary embodiment, the platform 12 also includes an optional first access panel 35 and an optional second access panel (not shown, positioned on the second side panel 36). In another embodiment, the platform 12 may include one or more access panels. The panels are connected or joined by fasteners, such as, but not limited to screws, bolts and pins. In another embodiment, the panels may be joined by fasteners, clips grooves, tabs or other fastening devices or methods as understood in the art. In another embodiment, the platform 12 may include one or more panels. In another embodiment, the platform 12 may include one or more panels that are connected and/or removable from one another.

FIG. 4 illustrates a partially exploded view of the platform 12 having the top, front, bottom, rear and first side panel 28, 30, 32, 34 removed. As can be seen in FIG. 4, the platform 12 further includes a data/video radio unit 38, a payload 42, a power supply 43, a drive system 44 and a control unit 46. Note that wiring and other physical/electrical connections have been removed for clarity, but would be present as understood by one of ordinary skill in the art. The data/video radio unit 38 provides wireless communications and video transmission to and from the MEUV.

The power supply 43 includes four batteries 48. In another embodiment, the platform 12 may include one or more control units and batteries. In another embodiment, the control unit 40 and batteries 48 may be combined into a single unit. In this exemplary embodiment, the batteries 48 are accessible by the first and second optional access panels 35, (not shown). In another embodiment, one or more control units and/or batteries may be accessed by one or more optional control panels.

The control unit 46 includes a processor (not shown) capable of controlling MEUV functions, including, but not limited to movement planning, drive system control, navigation, payload control, communications, power systems, payloads. The control unit 46 may include a global positioning system, or Inertial Navigation System (INS) (not shown) and or other navigation aids to provide data for movement planning and navigation. In this exemplary embodiment, the control unit 46 is a single unit. In another embodiment, the control unit 46 may include one or more units. In an embodiment, the control unit or part thereof, such as a control unit module, may be accessed by an access panel. The processor may include software and hardware including, but not limited to read-only-memory (RAM), solid state memory, and Field Programmable Gate Arrays (FPGAs) for controlling MEUV functions. The control unit 46 also includes antennas 50 and a control/power input port 52. In another embodiment, the control unit 46 may include one or more antennas. The antennas 50 provide for data reception and transmission and video transmission. In this exemplary embodiment, the control/power input port 52 provides connectivity to the control unit 40 and the batteries 48. The connectivity to the control unit 46 may be used to provide control unit programming such as, but not limited to mission programming, navigation programming, communications programming, power supply, motion profiles, and payload profiles. The connectivity to the batteries 48 may be used to provide battery charging.

In this exemplary embodiment, the payload 42 is a camera. The camera 42 is capable of capturing still pictures and video images and providing those images to the control unit 46. In another embodiment, the camera 42 may be cable of capturing still pictures and/or video. In another embodiment, the camera 42 may be capable of capturing, storing and/or transmitting images. In this exemplary embodiment, the control unit 46 also includes a motion device 54 capable of tilting or directing the camera 42. The motion control device 54 may be controlled by the camera 42 and/or by the control unit 46. In another embodiment, a motion device may be included in the payload 42 or may be omitted. In another embodiment, the payload 42 may be a camera, sensor, explosive, additional processor and/or beacon. The sensor may be, but is not limited to a chemical sensor, radiation sensor, electromagnetic field sensor, pressure sensor, and spectrum analyzer.

In this exemplary embodiment, the drive system 44 includes four drive units 56. Drive units 56 include an encoder 57, motor 58, gearbox 60 and output shaft 62. In another embodiment, the drive system 44 may include one or more drive units capable of powering two or more mobility devices. The drive system 44 is controlled by the control unit 46. In another embodiment, the drive system 44 may include hardware and/or software capable of providing control to the drive units 56. The encoder provides the control system feedback on individual motor position. The motor 58 receives instructions from the control unit 46 and provides power to the gearbox 60 to rotate or drive the output shaft 62. In this exemplary embodiment, the drive system 44 provides 4 wheel independent drives. In another embodiment the drive system 44 may provide two or more wheel drive, i.e. a set of opposing wheels may be driven by the same drive system or one or more wheel may be driven by one or more drive systems.

Figure 5:
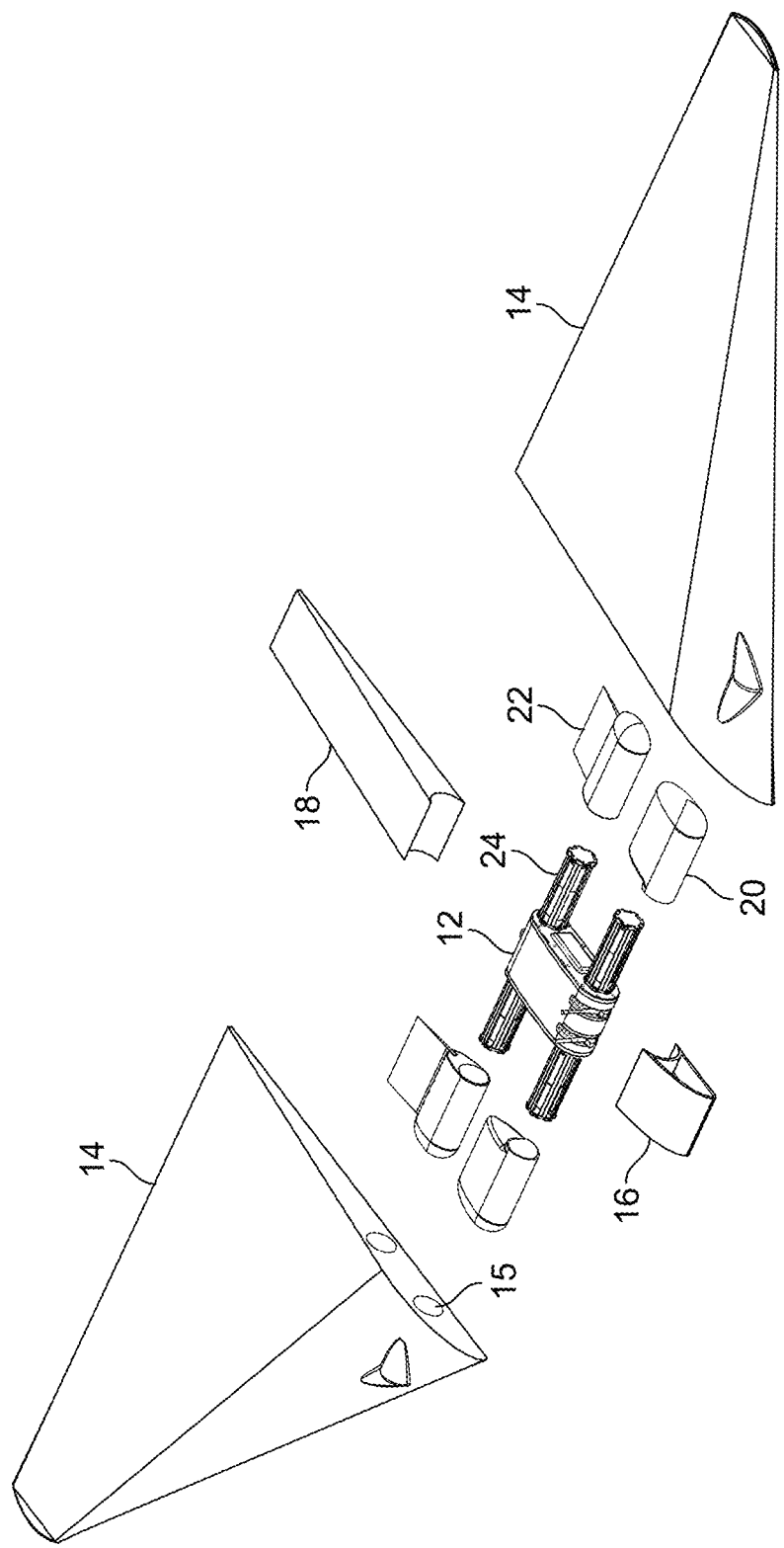
FIG. 5 is a partially assembled view of the unmanned vehicle of FIG. 1.
Figure 6:
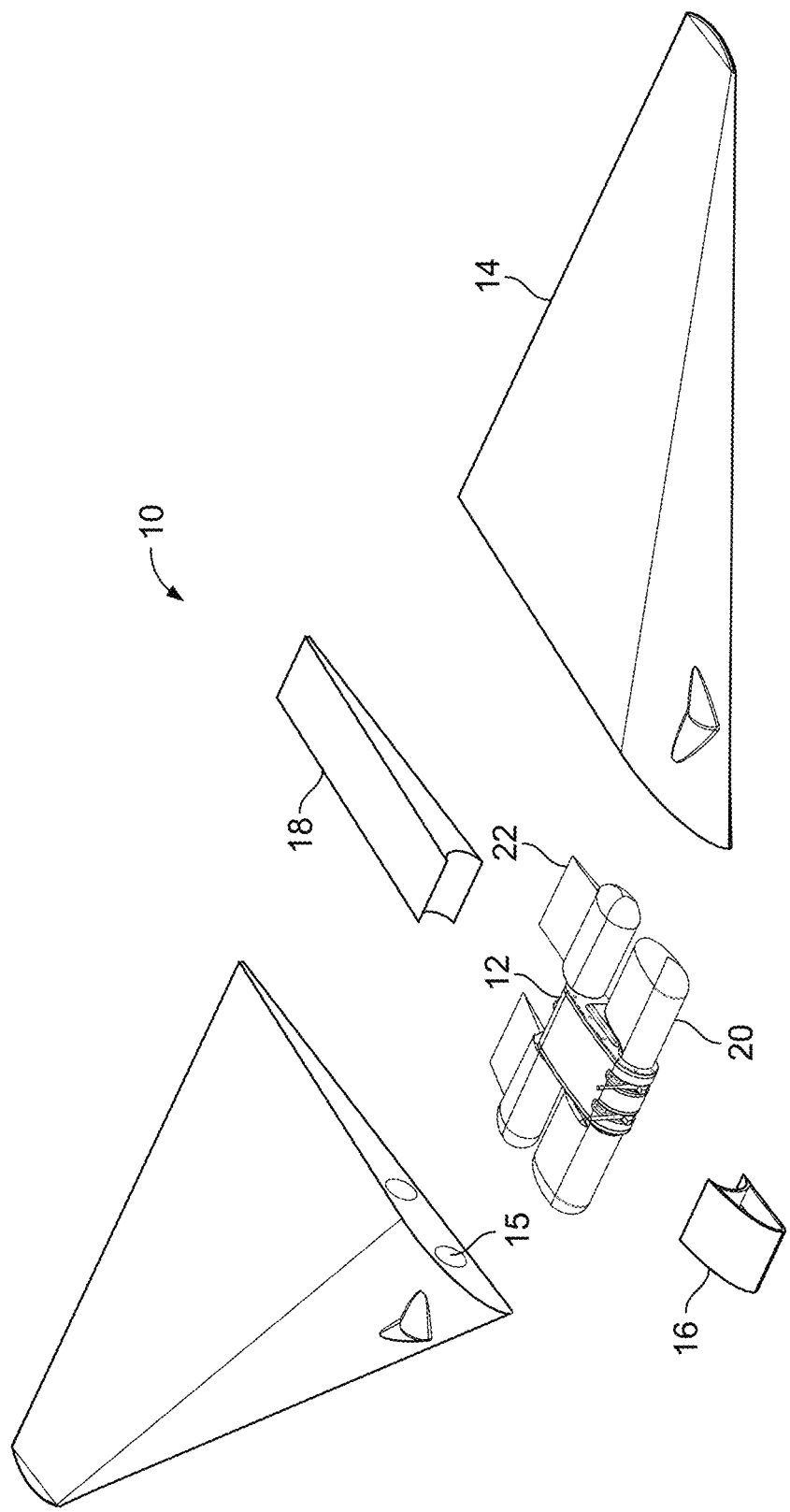
FIG. 6 is another partially assembled view of the unmanned vehicle of FIG. 1.

The MEUV 10 is assembled by collapsing the wheels 24 and attaching them to drive units 56 as shown in FIG. 5. In another embodiment, the wheels 24 do not collapse. Next, the control and propulsion planes 20, 22 are slipped over and attached to the wheels 24 as shown in FIG. 6. Lastly, the control and propulsion planes 20, 22 are collapsed and fitted into openings 15 in wings 14 to arrive at the MEUV aerial configuration 10A shown in FIG. 1. In another embodiment, the control and propulsion planes 20, 22 do not collapse and fit into other appropriate openings in wings 14.

Figure 7:
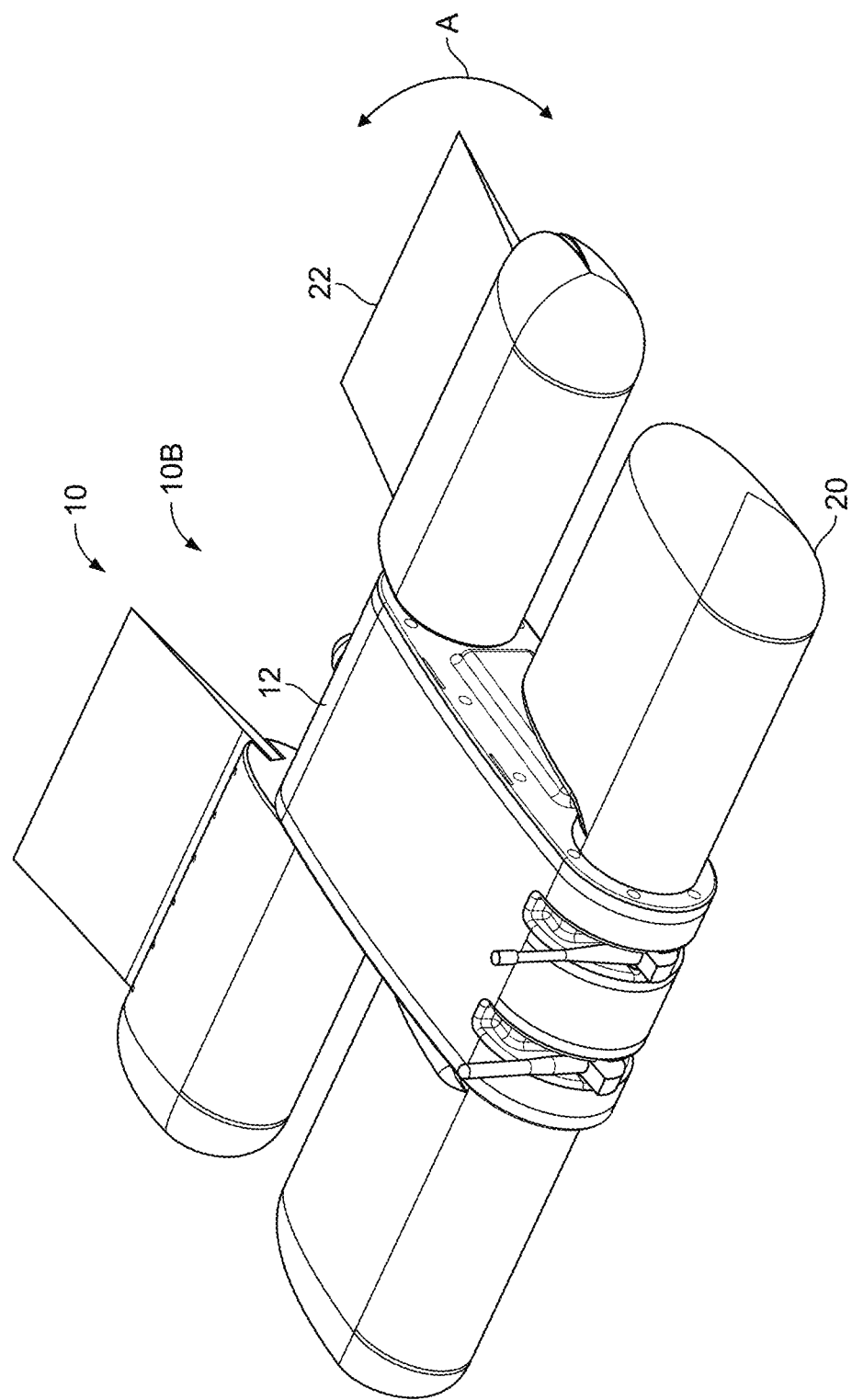
FIG. 7 is an embodiment of an MEUV aquatic configuration according to the present invention.

The MEUV 10 may be used or deployed by operating the MEUV aerial configuration 10A (FIG. 1) according to an assigned mission. Mission assignments and operation is discussed in further detail below. At some time into a mission, the wings 14 nose and tail assemblies 16, 18 are separated from the MEUV 10, and the MEUV 10 is now in an MEUV amphibious configuration 10B as shown in FIG. 7. The wings 14, nose and tail assemblies 16, 18 are separated, removed or jettisoned from the MEUV 10 by a mechanical release system (not shown). In another embodiment, the wings 14, nose and tail assemblies 16, 18 may be separated from the MEUV 10 by mechanical, gas or other separation system and technique. For example, small explosives, airbags, and the use of dissolving materials may be used to separate the components.

In this exemplary embodiment, the MEUV 10 in an MEUV aerial configuration 10B is an unpowered configuration. In this configuration, the MEUV 10 may be launched from another aerial vehicle or from a high platform, such as, but not limited to a building or terrestrial feature such as a hill or mountain. In an embodiment, the MEUV 10 in an MEUV aerial configuration may be towed by a powered Unmanned Aerial Vehicle (UAV) to a predetermined point and then cut free to glide in covertly. In another embodiment, the MEUV may include a power unit including a propeller or rocket, for example included in the wings 14, nose assembly 16 and/or tail assembly 18. In an embodiment, the MEUV may include the capacity to dump or separate the propulsion unit prior to entering a payload use zone.

As can be seen in FIG. 7, the MEUV 10 can be controlled in the MEUV aquatic configuration 10B by pivoting or partially rotating the control planes 20 in a direction as shown by arrow A. In such a manner, the MEUV 10 may be controlled to dive or ascend in a fluid environment. The fluid environment may be, but is not limited to a water or sea environment. Additionally, the MEUV 10 in the MEUV aquatic configuration 10B may be propelled or moved through a fluid environment by cyclically pivoting or oscillating the propulsion planes 22 in a direction as shown by arrow A.

In such a manner, the propulsion planes 22 will move up and down, much like a person using their feet to kick while swimming, to create a forward thrust. By oscillating one side faster than the other the MEUV 10 will be able to conduct turns that will change the MEUV heading. By controlling the angles of the control planes 22 the MEUV 10 will be able to dive, surface, and roll. In an embodiment, the MEUV 10 has positive buoyancy in water, which acts as a failsafe so that if the vehicle encounters a problem or obstacle that it cannot overcome while operating underwater in autonomous mode, the vehicle will automatically resurface so that communications can be reestablished.

Figure 8:
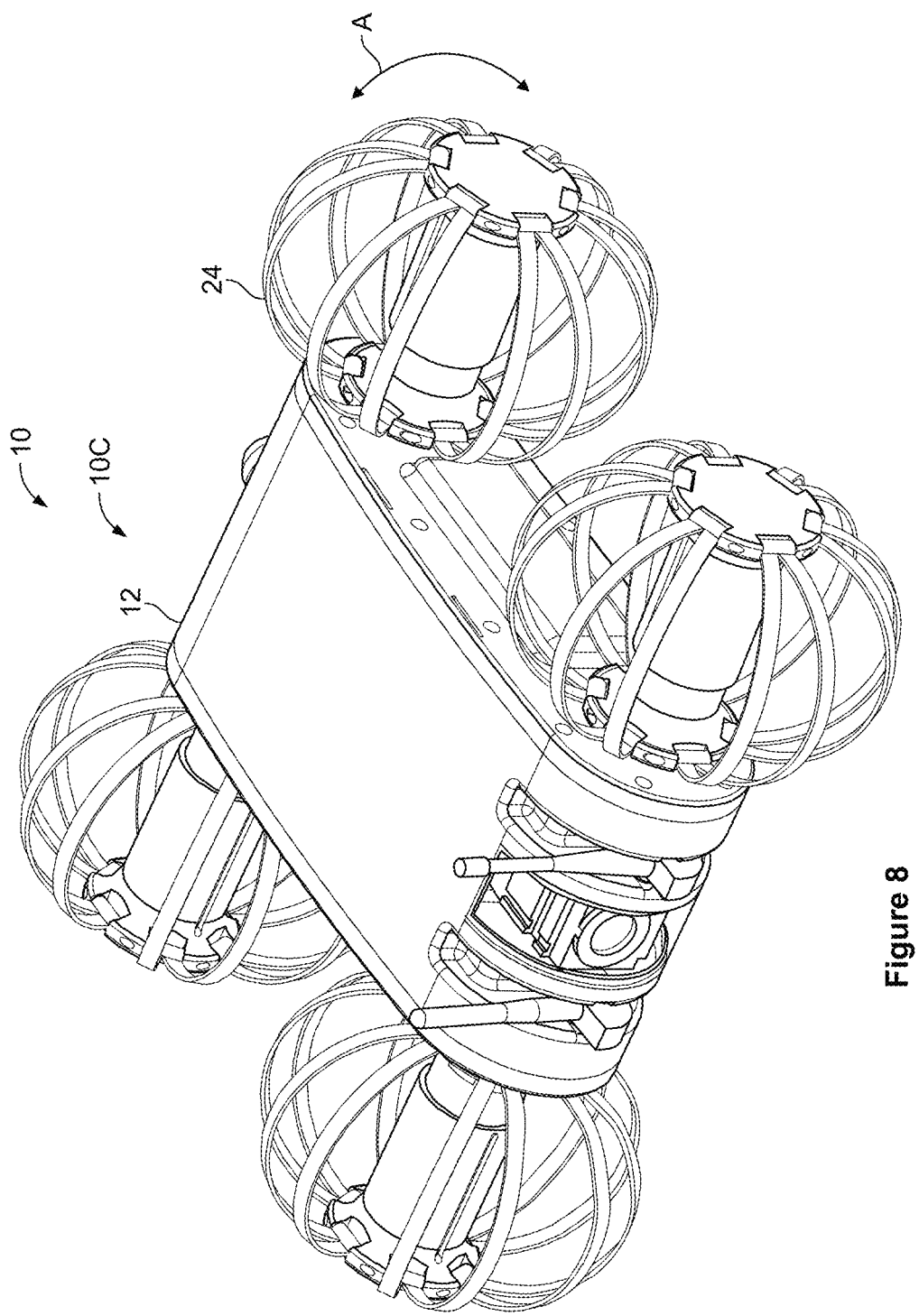
FIG. 8 is an embodiment of an MEUV land configuration according to the present invention.

At some time into a mission, the control and propulsion planes 20, 22 are separated from the MEUV 10, and the MEUV 10 is now in an MEUV terrestrial or land configuration 10C as shown in FIG. 8. The control and propulsion planes 20, 22 are separated, removed or jettisoned from the MEUV 10 by a mechanical release system (not shown). In another embodiment, the control and propulsion planes 20, 22 may be separated from the MEUV 10 by mechanical, gas or other separation system and technique. For example, small explosives, airbags, and the use of dissolving materials may be used to separate the components.

As can be seen in FIG. 8, the MEUV 10 in the MEUV land configuration 10C can be driven or moved over a terrain by rotating or driving the wheels 20 in a direction indicated by arrow A. The MEUV 10 in the MEUV land configuration 10C may be steered or turned by independently rotating or driving one or more wheels at a speed different from one or more of the other wheels.

The MEUV land configuration 10 also provides for aquatic mode driving wherein the platform 12 is a sealed unit that has negative buoyancy, which causes the MEUV to sink to the bottom of a water environment. Operation in this state would mimic terrestrial or land navigation.

The wheel design allows for good traction and incorporates a high energy absorbing suspension as well. A wheel is made up of several semi-circular molded flares that are spaced in order to allow the wheel to grip obstacles. Each individual flare acts as a leaf spring that can change its shape dramatically in order to absorb large bumps and shocks that the vehicle may encounter while navigating on land. Some scenarios that may require large energy absorption are tosses over a perimeter fence or into a second story window. In another embodiment, other wheel designs, such as, but not limited to solid wheels, inflated wheels, and tracks may be used.

In another embodiment, the MEUV may include two or more configurations selected from the aerial, amphibious and land configurations. For example, the MEUV may be configured to include an aerial/amphibious/land, aerial/amphibious, aerial/land, and amphibious/land configuration. For an aerial/land configuration, the wheels 20 would be contained or stored in wings 14. For an aerial/amphibious configuration, the control and propulsion planes 20, 22 would be connected to the drive units 56.

The ability for the MEUV to transition its operation between environments is rooted in the MEUV configurations. The MEUV can go through three different transitions, 1) Aerial to Aquatic, 2) Aerial to Terrestrial, and 3) Aquatic to Terrestrial. The manner in which the transition is carried can be mechanical and/or chemical. The transition may be performed by a mechanical release, air pressure assist, mechanical assist, the use of small explosives, airbags, to the use of dissolving materials. In an embodiment, in a transition between the aerial and aquatic or land configurations may be chemically assisted, wherein the wings, portions of the wings, or adhesive attaching the wings to the platform and/or other mobility attachments may be made of a material that dissolves in water, thus allowing for the wings to be detached from the platform. In another embodiment, in the transition from aerial mode to terrestrial mode, an airbag may be used to both absorb the energy of a crash landing, as well as to generate the force needed to remove the wings from the wheels. In another embodiment, the aquatic to terrestrial transition could be carried out with the use of small charges oriented to blow the wheel coverings off, or by simply burning the casing that covers the wheels.

Figure 9:
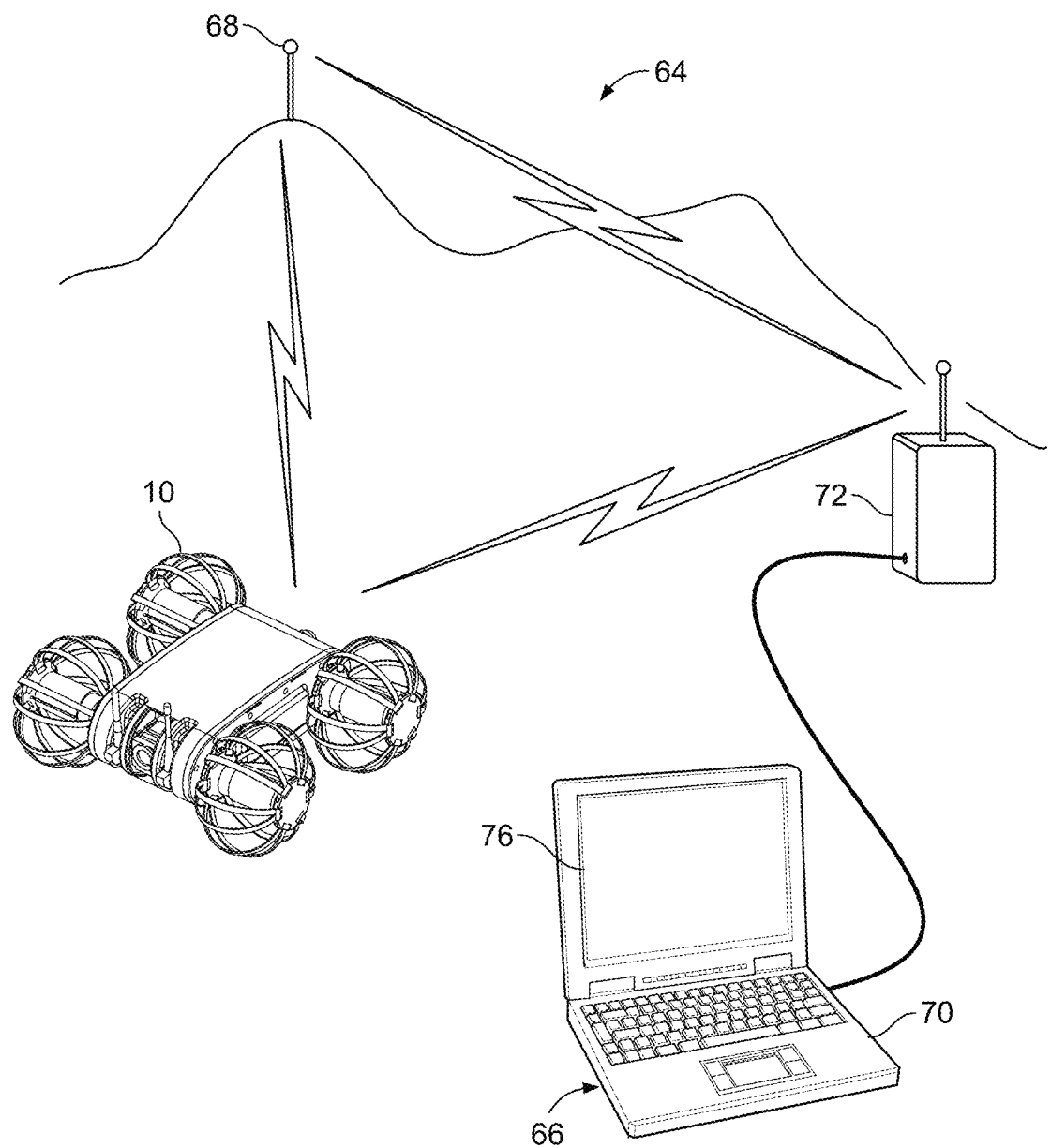
FIG. 9 is an illustration of an embodiment of an MEUV system according to the invention.

FIG. 9 illustrates an embodiment of a MEUV system 64 according to the invention. As can be seen in FIG. 9, the MEUV system 64 includes a MEUV 10 in a MEUV land configuration 10C, a command center 66, and a communications relay 68. It is understood that although FIG. 9 shows the MEUV 10 in the MEUV land configuration, the MEUV system 64 may be used to control the MEUV 10 in land, aquatic and/or aerial configuration. In an embodiment, the MEUV 10 may be autonomous in one or more of the mission configurations.

The control center 69 is capable of providing commands to and receiving data from the MEUV 10 while also in the MEUV aerial configuration 10A and the MEUV aquatic configuration 10B. For example, the MEUV 10 may be provided data, such as, but not limited to waypoint, navigation correction, mission correction, and payload commands by the command center at any time before or during the MEUV mission. In another embodiment, the MEUV 10 may perform all or part of its mission without the control center and communications relay 68. For example, the MEUV 10 may perform all or part of its mission without relaying data back to the command center and data from the MEUV 10 mission may be downloaded upon recovery.

In this exemplary embodiment, the command center 66 includes a user interface 70 and a communications system 72. The user interface 70 includes a processor (not shown) and display 76 for operator control. In addition, the processor may include software, hardware and memory (not shown) for MEUV operations and control. In another embodiment, the MEUV system 64 may include one or more command centers.

The command center 66 communicates with the MUEV 10 via communications system 72. The communications system 72 may include radio frequency (RF), microwave, optical or other communication architecture. In this exemplary embodiment, the communications relay 68 is a tower. In another embodiment, the communications relay may be on a satellite, aircraft, UAV, building, tower, structure or other object capable of providing line of site communications to the MEUV 10. In another embodiment, the MEUV system 64 may not include a communications relay. In yet another embodiment, the MEUV system 64 may include one or more communications relays.

According to another embodiment, a method for operating an MEUV is disclosed that includes programming an MUEV for a mission, deploying or launching the MEUV in an initial configuration selected for an MEUV aerial or aquatic configuration, transitioning the MEUV from either the aerial to aquatic or aquatic to land configurations, performing payload operations during the mission, optionally providing data to and receiving data from the MEUV during the mission, and optionally providing data to and receiving data from the MEUV after the mission. The MUEV can be commanded to reconfigure between aerial, aquatic, and land configurations by internal mission programming or upon a received message/transmission. Similarly, the payload may be controlled and/or modified by internal mission programming and/or by a received message/transmission. Additionally, mission planning, such as, but not limited to waypoints and navigation, may be controlled and/or modified by internal programming and/or received message/transmission.

According to the present invention, the MEUV may be reconfigured autonomously, that is, by mechanisms and methods performed by the MEUV itself, and/or by operator assistance to remove one or more of the mobility attachments. In an embodiment, the MEUV performs all of its reconfigurations including aerial to aquatic, aquatic to land and aerial to land, autonomously. In another embodiment, the MEUV may perform one or more of its reconfigurations including aerial to aquatic, aquatic to land and aerial to land, with an operator's assistance. For example, and operator may remove the aerial mobility and/or aquatic mobility attachments at a time or waypoint during a mission.

The present disclosure has been described relative to several exemplary embodiments. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention

We claim:

1. A multiple environment unmanned vehicle, comprising:
    a central platform comprising a control unit, drive system, power supply and a payload; and
    two or more mobility attachments attached to the central platform;
    wherein at least one of the two or more mobility attachments is an aerial configuration kit and wherein at least one other of the two or more mobility attachments is selected from a group consisting of an aquatic configuration kit and a land configuration kit; and
    wherein the aerial configuration kit covers at least one other of the two or more mobility attachments and is separable from the at least one other mobility attachments by a separation system; and
    wherein the aerial configuration kit configures the multiple environment unmanned vehicle into a delta wing configuration.

2. The vehicle of claim 1, wherein the separation system is selected from a group consisting of a mechanical release system, a gas release system, an explosive system, an airbag system and a dissolved materials system.

3. The vehicle of claim 1, wherein the aquatic configuration kit comprises one or more propulsion planes.

4. The vehicle of claim 1, wherein the land configuration kit comprises one or more wheels.

5. The vehicle of claim 1, wherein the payload is selected from a group consisting of a camera, sensor, explosive, additional processor and beacon.

6. The vehicle of claim 1, wherein the drive system comprises one or more motors coupled to an output shaft.

7. The vehicle of claim 6, wherein the one or more motors provides power to the two or more mobility attachments.

8. A multiple environment unmanned vehicle system, comprising:
 a multiple environment unmanned vehicle, comprising:
  a central platform comprising a control unit, drive system, power supply and a payload; and
  two or more mobility attachments attached to the central platform;
  wherein at least one of the two or more mobility attachments is an aerial configuration kit that configures the multiple environment unmanned vehicle into a delta wing configuration and at least one other of the two or more mobility attachments is selected from a group consisting of an aquatic configuration kit and a land configuration kit; and
  wherein at least one of the two or more mobility attachments cover at least one other of the two or more mobility attachments and is separable from the one other of the two or more mobility attachments by a separation system; and
 a command center comprising a user interface in communication with the multiple environment unmanned vehicle.

9. The system of claim 8, wherein the separation system is selected from a group consisting of a mechanical release system, a gas release system, an explosive system, an airbag system and a dissolved materials system.

10. The system of claim 8, wherein the aquatic configuration kit comprises one or more propulsion planes.

11. The system of claim 8, wherein the land configuration kit comprises one or more wheels.

12. The system of claim 8, wherein the payload is selected from a group consisting of a camera, sensor, explosive, additional processor and beacon.

13. The system of claim 8, wherein the drive system comprises one or more motors coupled to an output shaft.

14. The system of claim 13, wherein the one or more motors provides power to the two or more mobility attachments.

* * * * *